July 29, 1952 J. L. REYNOLDS 2,605,202
METHOD OF FORMING CONTINUOUS PIPES
Filed July 9, 1948 2 SHEETS—SHEET 1
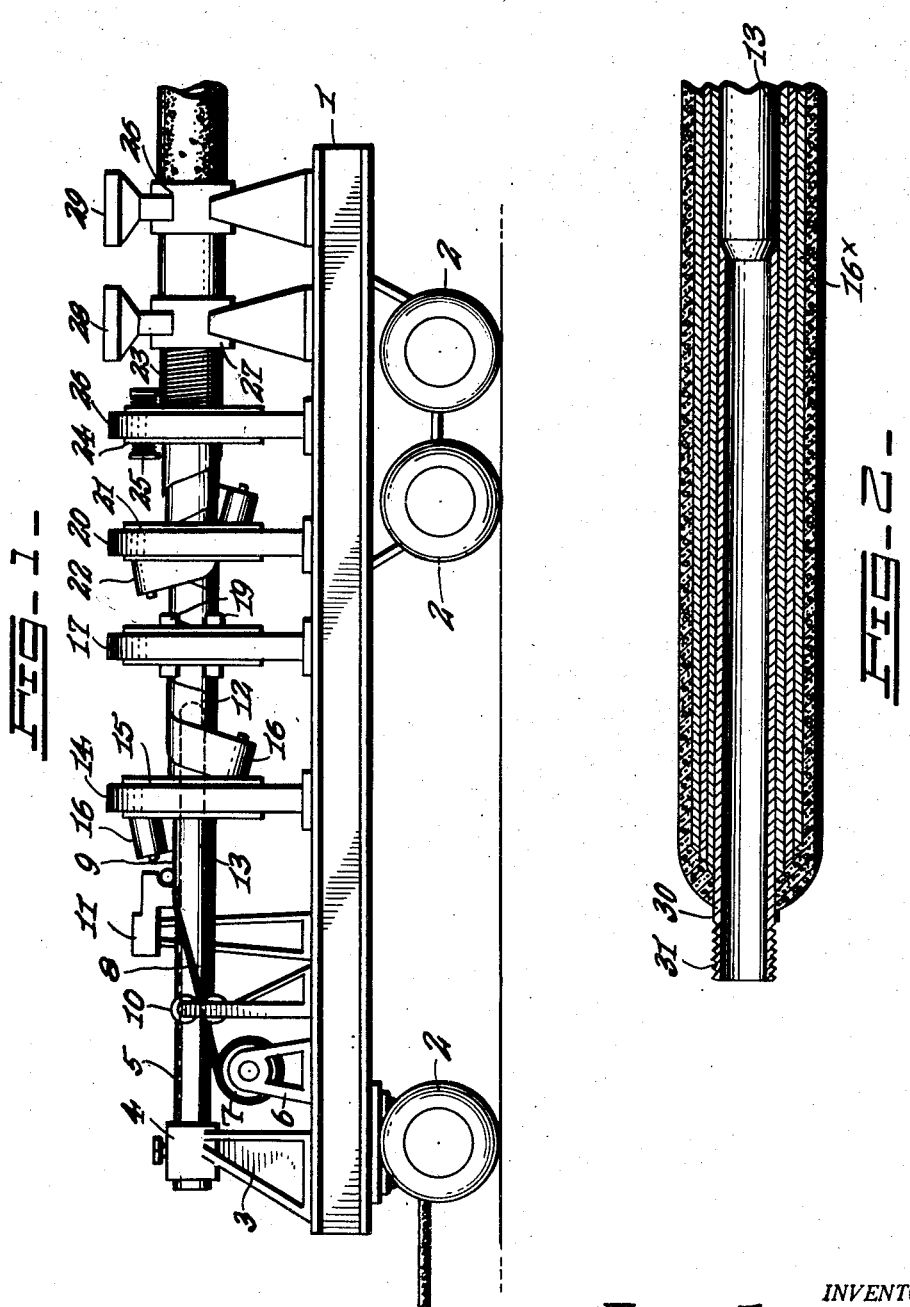
INVENTOR.
JULIAN L. REYNOLDS
BY
H. Lee Helms
ATTORNEY.

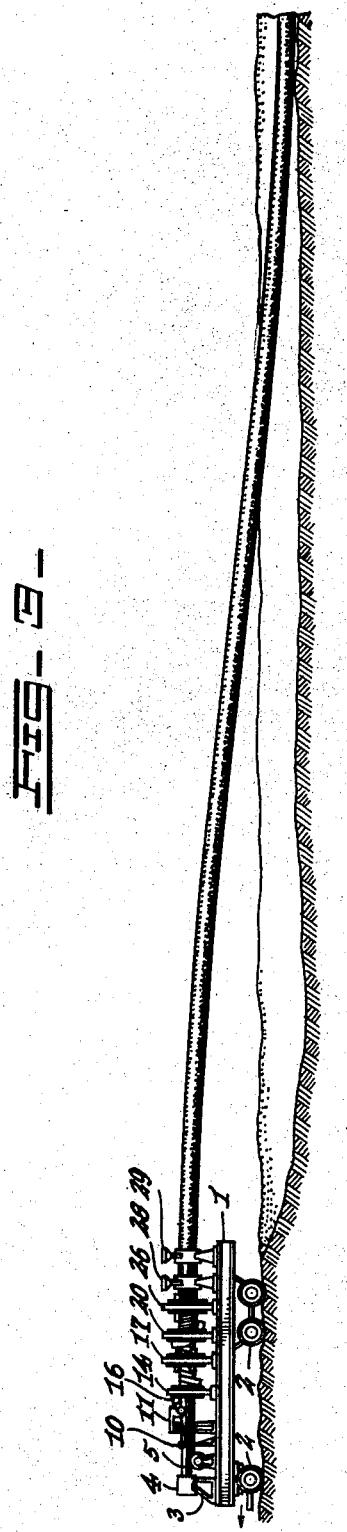

Patented July 29, 1952

2,605,202

UNITED STATES PATENT OFFICE 2,605,202

METHOD OF FORMING CONTINUOUS PIPES

Julian L. Reynolds, Richmond, Va.

Application July 9, 1948, Serial No. 37,963

8 Claims. (Cl. 154—83)

This invention relates to the forming of pipe in continuous lengths and particularly to forming such pipe from a plurality of layers of like or different materials. It has been customary heretofore, in the construction of pipe lines, to prefabricate sections of pipe at a central plant and to then transport the sections to the site and to assemble them, as by welding, bolting, or the like, into a continuous pipe line. Such previous methods involve considerable expense in transporting the pipe sections and necessitated the provision of large quantities of equipment in the field where the pipe was being assembled.

According to the present invention only the basic materials, usually in rolls of strip material, need be transported to the field. Such materials are then assembled and fabricated into a continuous pipe in situ without the necessity of joining short individual lengths together. According to the present invention, rolls of sheet materials such as metal, fabric or the like, are mounted on a traveling machine that wraps and folds the strip sheet material into a continuous tubular pipe structure while advancing along the line where it is desired to lay the pipe. The pipe produced by the present method remains stationary adjacent its ultimate location as it is being fabricated. The method of the present invention eliminates the necessity of transporting bulky pipe sections to the field and results in a pipe structure of laminated construction, which is known to be stronger than solid-wall pipe of the same thickness and offers the further advantage of flexibility in that the construction of the pipe may be varied from time to time to meet varying conditions encountered as the pipe line proceeds.

It is an object of this invention to provide a method for the construction of pipe whereby no bulky materials need be transported.

Another object of this invention is to provide a method for constructing pipes wherein the construction of the pipe may be varied from time to time without interrupting the continuous nature of the pipe produced.

A further object of this invention is to provide a method of constructing pipe utilizing readily available materials without the necessity of acquiring large and bulky machinery.

Further objects and advantages will appear as the description proceeds in connection with the accompanying drawings, wherein:

Figure 1 is a schematic illustration of a machine for carrying out the method of the present invention, and Figure 2 is a fragmentary sectional view of a portion of pipe constructed by the present method and illustrating a manner of providing terminal means for connection to standard pipe fittings.

Figure 3 is a view in elevation showing a formed area of the pipe extended from the apparatus and resting on the ground adjacent a trench. As the apparatus moves to the left the formed area will be progressively increased in length.

An apparatus for carrying out the method of the present invention is schematically illustrated in Figure 1 wherein a suitable frame or support member 1, mounted on suitable wheels 2, is adapted to be drawn by a suitable tractor (not shown) or other motive means. It is to be understood that the machine here described is merely illustrative of a possible manner of carrying out the method of the present invention and is not intended to be in any way limiting of the invention. The line along which a pipe line is to be led may be previously excavated to provide the necessary ditch or trench and the apparatus of Figure 1 is intended to be drawn along said trench adjacent thereto whereby the finished pipe may be lowered directly into the trench or alongside thereof, to be later lowered and buried.

Adjacent the forward end of the frame 1 a standard 3 may be provided with a hollow boss 4 in which a removable cylindrical mandrel 5 may be positioned and clamped. Adjacent the standard 3 and immediately to the rear thereof, a supporting means 6 may support a roll 7 of sheet metal or other material. The metal strip 8 from the roll 7 may be trained rearwardly and upwardly into contact with the outer surface of the mandrel 5 and by means (not shown) may be wrapped and trained around the mandrel so that the opposite edges of the said strip 8 form a joint, at 9, along the top surface of the mandrel. In wrapping sheet metal of any appreciable thickness around a mandrel in the manner described, the edge portions thereof will not abut each other throughout their entire edge surfaces unless the edges of the strip are beveled. This is true since the peripheral distance about the outer surface of the wrapped strip is greater than the peripheral distance around the inner surface thereof and since strip sheet metal is normally supplied in roll form wherein the widths across opposed surfaces are equal. In the event a butt joint is desired at the edges of the strip 8, trimming knives 10 may be provided to trim the edges of the strip 8 to the bevel desired. The exact angle of the bevel will depend upon the diameter of the mandrel employed at the time.

If the metal from the roll 7 is susceptible to welding or soldering, a continuous welding or soldering means 11 may be positioned to so weld or solder the joint immediately upon the edges of the material being brought together. It will be seen that as the frame 1 advances the length of finished pipe extending therebehind will act to strip the wrapped material 8 from the mandrel 5 in a continuous manner, thus producing a continuous liner for the pipe having a longitudinal seam therein. The mandrel 5 preferably extends rearwardly beyond the point at which the seam 9 is formed and preferably to such point as indicated at 12 in Figure 1. The liner 13, formed in the manner just described, moves rearwardly adjacent the free end of the mandrel 5 through a wrapping means comprising an upright frame 14 fixedly carried by the frame 1. A rotary frame 15 is mounted for rotation in the frame 14 about an axis coincident with the axis of the mandrel 5 and liner 13. Rolls 16 of strip sheet material are carried by the rotary frame 15 and rotate therewith about the liner 13 as the latter moves rearwardly relative to the frame 1. The rolls 16 will preferably be arranged with their axes at an angle to the axis of the mandrel 5 and that angle will be so related to the axis of the mandrel 5 that strip material carried by the rolls 16 will be wrapped around the outer periphery of the liner 13 to form helically wound layers of material 16x thereover with their edges preferably in abutting relationship. The rotary frame 15 is driven by means (not shown) in timed relation to the movement of the frame 1 over the ground to thereby ensure proper wrapping of the strip material on the liner in the desired manner. The strip material from the rolls 16 may be sheet metal or any other desired material.

As the frame 1 moves longitudinally of the wrapped liner thus formed, a frame 17 carrying a rotary frame 18, similar in all respects to frames 14 and 15, is caused to advance along the wrapped liner and includes a plurality of shoes or the like 19. The shoes 19 may be shaped to conform to the outer surface of the wrappings 16x and may be employed to smooth or "iron" the said wrappings, or they may be employed to apply heat and pressure to set an adhesive, melt solder, or may be adapted to perform a continuous welding of the joints between the edges of the helically wrapped material. In the latter event, the shoes 19 will be replaced by suitable welding mechanism and the rotation of the frame 18 would have to be so timed to the advance of the machine that the welding mechanism would closely follow the helical joint.

Following the step performed by the shoes 19, the pipe is caused to pass through a frame 20 supporting a rotatable frame 21 carrying reels 22 of additional sheet material to be wrapped on the pipe. If desired, the frame 21 may be caused to rotate in a direction opposite to the direction of rotation of the frame 15 to thus apply its wrappings helically on the pipe but extending in the opposite direction from the wrappings from the rolls 16. The rolls of material 22 may comprise fabric or paper, either dry or impregnated, with any suitable material.

Following the application of the wrappings 22x, the pipe may be further wrapped with a tension strand 23 applied by a rotatable frame 24 carrying a roll 25 of the strand material 23. The rotatable frame 24 is carried in a stationary frame 26 and is structurally similar to the previously described means 14, 15 and 20, 21. The wrapping 23 would preferably be wire or other filamentary material capable of being tensioned to resist internal pressures in the pipe when the latter is put into use.

Following application of the filament 23, an extruding head 27 may be passed over the pipe and material supplied from a hopper 28 may be fed to the extruding head 27 to apply a coating of protective or insulating material to the pipe. The material applied by the extruding head 27 may be a paint, resin, or asphalt or the like. Instead of applying this coating by extrusion, it could readily be sprayed or brushed onto the pipe.

If further desired, a second extruding head 28x supplied from a hopper 29 may be arranged to apply an exterior coating of cementitious material to the pipe. The cementitious material may be a stiff mix of Portland cement with or without a mineral aggregate or it may be any other suitable material. In many instances it may be found desirable to apply an outer coating of a quick setting cement. In the event a stiff mixture of Portland cement is employed, it will be desirable that the pipe be thereafter lowered directly into position in the ditch or trench provided therefor with a minimum of handling to prevent distortion or displacement of the cementitious coating. If desired, the pipe could be lowered into the trench before application of the cementitious coating and the latter could be applied as the pipe approaches the bottom of the trench.

With the apparatus suggested, the method of the present invention can be practiced on a variety of forms of pipe. For instance, the liner 8 may be of any desired metal. It could be of aluminum, steel, copper or the like and the thickness thereof would be determined by the ultimate strength required and the nature of the material to be carried by the pipe line. For certain purposes, it may be desirable to employ anodized aluminum or a strip of sheet metal having a coating of lacquer on the inner surface. For certain purposes, it may be desirable to form a lap joint at 9 rather than the abutting joint described in which suitable adhesive or sealing material could be applied to the edges of the strip 8 and caused to adhere the edges of the liner together. In the event a lap joint is desired, the trimming knives 10 could be omitted.

For certain purposes it might also be desirable to form a crimped joint between the edges of the liner 13. In such a case, the trimming knives 10 could be replaced by suitable flange forming rolls, whereby the material 8 when wrapped around the mandrel 5 would present edge flanges to each other and the structure 11 could be replaced by suitable rollers or the like, to crimp the said flanges to form an interlocked seam.

The rotary frame 15 may be provided with any desired or practical number of rolls of strip material and the said rolls of material could be similar or dissimilar materials. For instance, all of the rolls 16 could contain sheet metal, either similar to or different from the sheet metal of the liner 13. Also the rolls 16 could alternately wrap fabric and paper or metal or the leading roll could wrap a film of thermoplastic or thermosetting adhesive and the following roll could wrap a strip of metal thereover. In such a case the shoes 19 would be employed to provide the necessary heat and pressure for the setting of said adhesive, thus bonding the wrapped layer of metal to the liner 13.

In like manner the material of the rolls 22 could be any chosen material or combinations thereof. For instance, sheets of resinous material or paper or cloth impregnated with resins or asphalts could be wrapped. Also fibrous strips impregnated with silicone varnishes could be used especially where resistance to high temperatures is desired, or a phenol formaldehyde impregnant may be used. Glass fabrics or strands could also be wrapped on the pipe if the conditions to which the pipe would be subjected could be satisfactorily resisted by such a wrapping.

The tensioning strands 23 could also be of any suitable material or filaments such as wire, or glass, or thin ribbons of metal having the required tensile strength.

Clearly any desired arrangement or sequence of layers may be applied to the pipe. The various instrumentalities indicated in Figure 1 of the drawings could be rearranged to perform their operations in a different sequence or any one or more of them could be omitted, or additional mechanisms could be added, all depending upon the nature and structure of the pipe to be ultimately constructed.

According to the present invention, the structure of the pipe could be varied from time to time in a single pipe line when different soil or conditions of terrain are encountered. The number of layers of metal or stiffening material could be increased in localities where great mechanical strains would be applied to the pipe line. Likewise more protective coatings or thicker coatings could be applied where the nature of the soil renders it highly corrosive.

In the event pipe structures are chosen which involve adjacent layers of dissimilar metals, it would be desirable to interpose a layer of insulating material therebetween to prevent destructive electrolysis. The method of the present invention could be employed to construct pipes for carrying liquid under pressure or for carrying gases or vapors by merely varying the thickness thereof or the number and nature of layers applied over the liner. For instance, air conductors could be constructed having a liner of very thin metal with subsequent layers of impregnated paper. Electrical conduits would preferably be formed with a liner of insulating material and the wires could be laid in the conduit by being fed through a hollow mandrel as the conduit is made.

A pipe constructed according to the present invention would preferably be first made in cylindrical form and if different forms are desired the cylindrical pipe could be pressed into square, rectangular, elliptical or other shape by suitable rolls or dies placed in the desired position between any of the pairs of means 14, 17, 20 or 26.

It is entirely feasible that the mandrel 5 may be other than cylindrical to form the liner of the desired sectional shape in the first instance. It is also possible to construct the inner liner by helically wrapping sheet material in the manner of the wrap of rolls 16 directly on the mandrel and by immediately welding or otherwise bonding the helical joints whereby the liner could be readily stripped from the mandrel 5 in the manner described, also any of the subsequent layers could be applied in convolute form in a manner similar to the forming of the liner 13.

The method of the present invention may also be practiced by employing separate sheets of material, in flat rather than roll form. For instance, the liner could be made from individual sheets fed laterally into surface contact with a rotatable mandrel and thus rolled into the desired shape. Such a procedure would involve rotating the mandrel to wrap the liner sheet thereon, then partially wrapping subsequent layers on said section of liner while the latter and its mandrel are stationary, then stripping the liner from the mandrel while the latter is held stationary. Such a procedure, especially where subsequent layers are also applied in the form of flat sheet material, would necessitate advancing the frame 1 intermittently rather than continuously but all of the above suggested modifications of pipe structure could be produced.

It is desirable that a continuous pipe of the nature described be provided with means at its terminal end to facilitate attachment to standard pipe fittings or the like. A pipe constructed in accordance with the methods described heretofore would not readily lend itself to connections to standard pipe fittings or to other sections of similar pipe. To provide for such contingencies, it is proposed that terminal connecting means be applied somewhat as follows:

When a point is reached in the fabrication of continuous pipe where it is desired to form a terminal end therein for connection to other pipes or fittings or the like, the machine is temporarily stopped and the mandrel 5 is withdrawn while leaving a partially formed liner and subsequent layers in a partially completed state. A short length of pipe is substituted for the mandrel 5 and is inserted into the partially completed liner to the desired extent and fabrication of the pipe is resumed in the manner previously described. However, at this time, the short section of pipe is not held stationary as was the mandrel 5 but is allowed to proceed through the machine along with the completed portions of the composite pipe. As the outer end portion of the moving section of pipe approaches the roll 7 the latter is cut and the liner thus terminated short of the trailing end of the pipe nipple 30. As the nipple progresses through the machine, each layer is terminated, preferably just short of the end of the previously applied layer and when the end of the pipe has passed completely through the machine, a structure similar to that indicated in Figure 2 will result. The pipe nipple 30 may be provided with suitable threads 31 or any other means to readily adapt it for connection to the desired structure. If desired, the pipe nipple 30 may be held stationary and employed in place of the mandrel 5 until it is desired to form a terminal end in the manner described.

During the wrapping of the successive layers on the liner 13, it is contemplated that suitable brake means be provided to tension the material coming from each of the rolls to thereby control the tension in the layers and during application of the layers to the terminal nipple 30 it is preferred that the tension in each layer be increased to thereby increase the frictional gripping of the liner on the nipple 30. If desired, a suitable adhesive may be applied between the nipple 30 and the liner 13 to ensure proper retention of the nipple in the end of the fabricated pipe.

Although a limited number of modifications of pipe involving a limited number of steps has been disclosed herein, such disclosure is intended to be merely illustrative and in no sense limiting since it is contemplated that other forms of pipe constructed by other forms of apparatus be included in the scope of the invention and that the said invention be limited only by the appended claims.

I claim:

1. A method of forming pipe comprising the steps of forming a continuous tubular liner of sheet metal, wrapping said liner with reinforcing means, said liner forming and reinforcement wrapping being performed at stations moving continuously along the length of the liner while maintaining the liner stationary against both rotary movement and movement in a direction along its length, whereby the continuous pipe thus formed remains stationary.

2. A method of forming pipe comprising the steps of forming a continuous tubular liner of sheet metal, wrapping said liner with reinforcing means, and covering the structure thus formed with a protective layer, the said steps being performed at stations moving continuously along the length of the liner while maintaining the liner stationary against both rotary movement and movement in a direction along its length, whereby the continuous pipe thus formed remains stationary.

3. A method of forming pipe comprising the steps of forming a continuous tubular liner of sheet metal, applying layers of reinforcing and protective materials about said liner, bonding said liner and layers together, and extruding a layer of cementitious material over the pipe, the said steps being performed at stations moving continuously along the length of the liner while maintaining the liner stationary against both rotary movement and movement in a direction along its length, whereby the continuous pipe thus formed remains stationary.

4. A method of forming pipe comprising the steps of forming a continuous tubular liner of convolutely wrapped sheet aluminum, wrapping said liner with a plurality of layers of reinforcing means, said liner forming and reinforcement wrapping being performed at stations moving continuously along the length of the liner while maintaining the liner stationary against both rotary movement and movement in a direction along its length, whereby the continuous pipe thus formed remains stationary.

5. A method of forming pipe comprising the steps of forming a continuous tubular liner of sheet metal on a moving mandrel, wrapping said liner with a plurality of layers of reinforcing means, and covering the structure thus formed with a protective layer, the said steps being performed at stations fixed with respect to said moving mandrel and moving continuously in a direction along the length of the liner and while maintaining the liner stationary against both rotary movement and movement in a direction along its length, whereby the continuous pipe thus formed remains stationary.

6. A method of forming pipe comprising the steps of forming a continuous tubular liner of sheet aluminum, applying layers of reinforcing and protective materials about said liner, at least some of said layers being of a sheet aluminum, bonding said liner and layers together, and extruding a layer of cementitious material over the pipe, the said steps being performed at stations moving continuously along the length of the liner while maintaining the liner stationary against both rotary movement and movement in a direction along its length, whereby the continuous pipe thus formed remains stationary.

7. A method of forming pipe which is to be laid along the ground, comprising the steps of forming a continuous tubular liner of sheet metal about a horizontal mandrel while simultaneously moving the mandrel with respect to the ground in a horizontal direction along its axis and out of the liner thus formed and while restraining the liner against either axial or rotative movement.

8. A method for forming continuous pipe and continuously laying the pipe along the ground, comprising the steps of forming a continuous tubular liner of sheet metal about a horizontal mandrel while simultaneously moving the mandrel with respect to the ground in a horizontal direction along its axis and out of the liner thus formed and while restraining the liner against either axial or rotative movement, and then forming a protective and reinforcing coating about the liner while maintaining the liner stationary with respect to the ground so as to form a continuous stationary pipe spaced above the ground, and then continuously lowering said pipe to the ground as it continues to be formed.

JULIAN L. REYNOLDS.

REFERENCES CITED

The following references are of record in the file of this patent:

UNITED STATES PATENTS

| Number | Name | Date |
| --- | --- | --- |
| 952,488 | Wiggins | Mar. 22, 1910 |
| 1,954,892 | Russel et al. | Apr. 17, 1934 |
| 1,962,876 | Reinert et al. | June 12, 1934 |
| 2,302,163 | Anderson | Nov. 17, 1942 |
| 2,306,945 | Hebron | Dec. 29, 1942 |
| 2,309,903 | Hume | Feb. 2, 1943 |
| 2,367,844 | Cuno | Jan. 23, 1945 |
| 2,371,224 | Cumfer | Mar. 13, 1945 |
| 2,393,347 | Stuart et al. | Jan. 22, 1946 |
| 2,405,909 | Smith et al. | Aug. 13, 1946 |
| 2,447,168 | Dean et al. | Aug. 17, 1948 |
| 2,539,814 | Chernack | Jan. 30, 1951 |

FOREIGN PATENTS

| Number | Country | Date |
| --- | --- | --- |
| 283,035 | Great Britain | Jan. 5, 1928 |